(12) United States Patent
Ilic et al.

(10) Patent No.: US 10,693,828 B2
(45) Date of Patent: *Jun. 23, 2020

(54) PRESENTING CONTACTS TO A SOCIAL NETWORKING SYSTEM USER BASED ON USER INTERACTIONS WITH ADDITIONAL USERS AND WITH GROUPS

(71) Applicant: Facebook, Inc., Menlo Park, CA (US)

(72) Inventors: Aleksandar Ilic, Palo Alto, CA (US); Chuang Wu, Fremont, CA (US); Peter Henry Martinazzi, Huntington Beach, CA (US); Ziqing Mao, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 15/790,798

(22) Filed: Oct. 23, 2017

(65) Prior Publication Data
US 2018/0048616 A1    Feb. 15, 2018

Related U.S. Application Data

(63) Continuation of application No. 14/510,647, filed on Oct. 9, 2014, now Pat. No. 9,800,535.

(51) Int. Cl.
*H04L 1/00*       (2006.01)
*H04L 12/58*     (2006.01)

(52) U.S. Cl.
CPC ............ *H04L 51/32* (2013.01); *H04L 51/14* (2013.01)

(58) Field of Classification Search
CPC .............................. H04L 51/32; H04L 51/14
See application file for complete search history.

(56) References Cited

U.S. PATENT DOCUMENTS

| | | | |
|---|---|---|---|
| 8,386,619 B2 | 2/2013 | Mallet et al. | |
| 2009/0070219 A1 | 3/2009 | D'Angelo et al. | |
| 2009/0228335 A1 | 9/2009 | Niyogi et al. | |
| 2010/0241580 A1 | 9/2010 | Schleier | |
| 2010/0299391 A1* | 11/2010 | Demarta | G06F 15/16 709/205 |
| 2011/0082915 A1* | 4/2011 | Carr | H04N 21/25891 709/219 |

(Continued)

OTHER PUBLICATIONS

United States Office Action, U.S. Appl. No. 14/510,647, dated Dec. 13, 2016, 14 pages.

*Primary Examiner* — Kris E Mackes
*Assistant Examiner* — Tiffany Thuy Bui
(74) *Attorney, Agent, or Firm* — Fenwick & West LLP

(57) ABSTRACT

A social networking system selects a set of contacts for presentation to a user of the social networking system. A contact is an additional user or a group of users maintained by the social networking system. To select the set of contacts, the social networking system generates scores associated with additional users of the social networking system and groups of users based on interactions between the user and various additional users and between the user and groups of users. Based on the scores associated with additional users and with groups of users, the social networking system selects a set of contacts from the additional users and the groups of users. Information identifying the set of contacts is communicated from the social networking system to a client device for presentation to the user.

16 Claims, 2 Drawing Sheets

(56) References Cited

U.S. PATENT DOCUMENTS

| | | | |
|---|---|---|---|
| 2011/0225608 A1* | 9/2011 | Lopatecki | G06F 15/16 725/34 |
| 2011/0270719 A1* | 11/2011 | Hollars | G06Q 30/02 705/30 |
| 2012/0059884 A1* | 3/2012 | Rothschild | G06F 16/954 709/206 |
| 2012/0066722 A1* | 3/2012 | Cheung | H04M 1/7253 725/62 |
| 2012/0084666 A1* | 4/2012 | Hickman | G06Q 30/02 715/751 |
| 2012/0102124 A1* | 4/2012 | Hansson | G06Q 30/02 709/206 |
| 2012/0166532 A1 | 6/2012 | Juan et al. | |
| 2012/0209786 A1 | 8/2012 | Shah et al. | |
| 2013/0073632 A1 | 3/2013 | Fedorov et al. | |
| 2013/0073983 A1 | 3/2013 | Rasmussen et al. | |

\* cited by examiner

PRESENTING CONTACTS TO A SOCIAL NETWORKING SYSTEM USER BASED ON USER INTERACTIONS WITH ADDITIONAL USERS AND WITH GROUPS

CROSS REFERENCE TO RELATED APPLICATIONS

This application is a continuation of U.S. application Ser. No. 14/510,647, filed Oct. 9, 2014, now U.S. Pat. No. 9,800,535, which is incorporated by reference in its entirety.

BACKGROUND

This disclosure relates generally to social networking systems, and more specifically to identifying contacts for a social networking system user.

An online system, such as a social networking system, allows its users to connect to and communicate with other online system users. Users may create profiles on an online system that are tied to their identities and include information about the users, such as interests and demographic information. The users may be individuals or entities such as corporations or charities.

A user may communicate messages or other content to additional users via a social networking system. For example, a user identifies an additional user from an interface and specifies content for communication to the additional user via the social networking system. However, as a user establishes connections to an increasing number of additional users, the user may be required to navigate through a large amount of information to identify an additional user to receive content. This additional navigation may discourage the user from communicating content to certain additional users or from using the social networking system to communicate content to additional users.

SUMMARY

Users of a social networking system communicate messages or other content to each other via the social networking system. To simplify communication of content, the social networking system identifies a set of contacts to a user based on prior interactions with the user. These contacts are identified via an interface of a messaging application associated with the social networking system. When the user interacts with a contact through the interface of the messaging application, the user initiates communication with the contact via the social networking system. For example, if the user interacts with information identifying a contact via the interface of the messaging application, the social networking system provides the user with an interface for communicating messages to the contact via a messaging, or a "chat," session. Additionally, the social networking system maintains one or more groups that include multiple users, allowing a user to communicate content to multiple users by communicating the content to a group. When identifying contacts to the user, the social networking system generates scores for additional users based on interactions between the user and various additional users through the interface of the messaging application and generates scores for groups of users based on interactions between the user and the groups of users through the interface of the messaging application.

A score associated with an additional user or with a group of users provides a measure of a likelihood of the user interacting with the additional user or with the group of users via the interface of the messaging application. In various embodiments, a score associated with an additional user is based on messages communicated from the user to the additional user initiated via the interface of the messaging application and messages communicated from the user to the additional user after the user received a message from the additional user initiated via the interface of the messaging application. A frequency of interactions, a number of interactions, or any other suitable information based on interactions between the user and the additional user via the interface of the messaging application, or via another channel, may be used to determine the score associated with the additional user. Similarly, messages communicated to a group by the user initiated via the interface of the messaging application or communicated by the user to the group after the user received a message from the group initiated via the interface of the messaging application are used to determine a score associated with the group. When determining a score, privacy settings associated with users are enforced, so a user may prevent use of certain interactions when determining a score; for example, the user identifies certain interactions between the user and an additional user as private, and the social networking system does not use the interactions identified as private when determining the additional user's score. Additionally, privacy of content associated with an interaction is maintained when determining a score. For example, content included in a message communicated from a user to an additional user is not accessed when determining the additional user's score. The social networking system may apply one or more models to interactions between the user and one or more additional users via the interface of the messaging application and to interactions between the user and one or more groups via the interface of the messaging application to determine the scores associated with additional users and associated with groups. For example, different models are used to generate scores for an additional user depending on whether the additional user is accessing the social networking system or depending on a type of client device used by the additional user to access the social networking system.

Based on the scores associated with one or more additional users and associated with one or more groups, the social networking system selects a set of contacts. For example, the social networking system ranks additional users and groups by their associated scores and selects a set of contacts as additional users or groups having at least a threshold position in the ranking. Alternatively, the social networking system selects a set of contacts as additional users or groups associated with at least a threshold scores. Information describing the set of contacts is communicated from the social networking system to a client device associated with the user for presentation via the interface of the messaging application. When the user interacts with information describing a contact via the interface of the messaging application, the user is prompted to initiate communication with the additional user or with the group associated with the contact via the social networking system. Additionally, an order for the set of contacts items may be determined based on the scores associated with the contacts, so the information identifying the contacts in the set is presented by the client device in the specified order.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
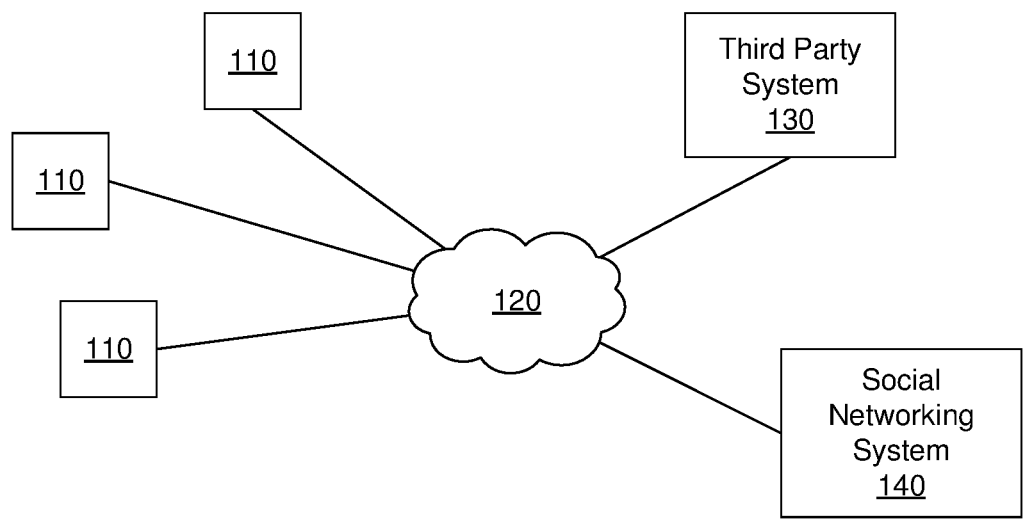
FIG. 1 is a block diagram of a system environment in which a social networking system operates, in accordance with an embodiment.

FIG. 1 is a block diagram of a system environment 100 for a social networking system 140, such as a social networking system. The system environment 100 shown by FIG. 1 comprises one or more client devices 110, a network 120, one or more third-party systems 130, one or more machines 135, and the social networking system 140. In alternative configurations, different and/or additional components may be included in the system environment 100. The embodiments described herein may be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
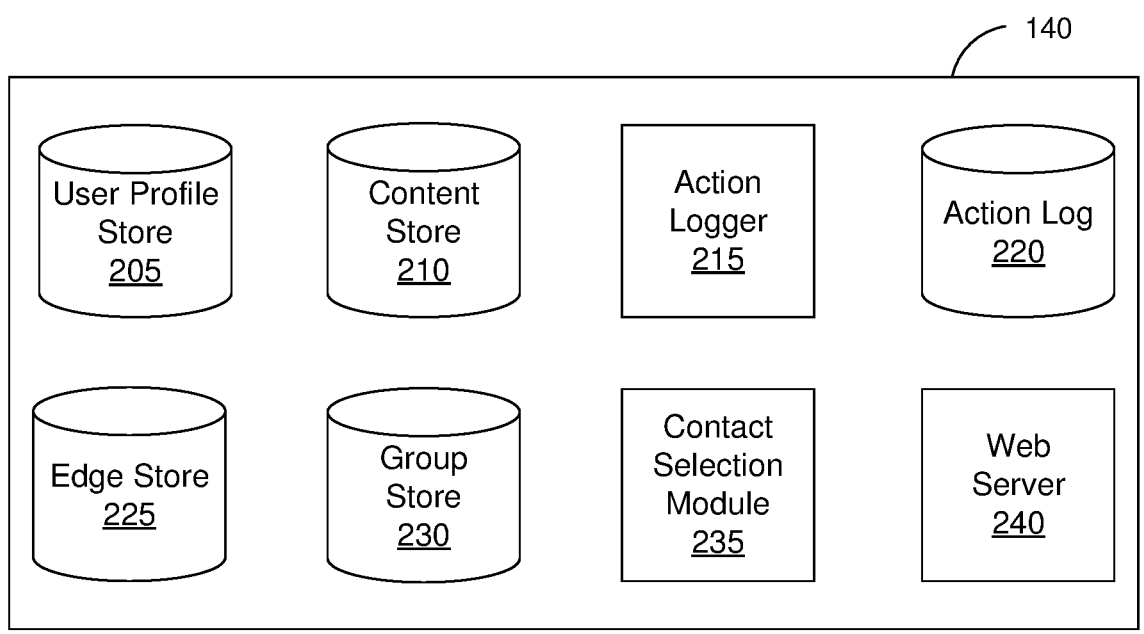
FIG. 2 is a block diagram of a social networking system, in accordance with an embodiment.

FIG. 2 is a block diagram of an architecture of the social networking system 140. The social networking system 140 shown in FIG. 2 includes a user profile store 205, a content store 210, an action logger 215, an action log 220, an edge store 225, a group store 230, a contact selection module 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the social networking system 140, events, groups or applications. In some embodiments, objects are received from third-party applications or third-party applications separate from the social networking system 140. In one embodiment, objects in the content store 210 represent single pieces of content, or content "items." Hence, online system users are encouraged to communicate with each other by posting text and content items of various types of media to the social networking system 140 through various communication channels. This increases the amount of interaction of users with each other and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the social networking system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Further, the action log 220 may record the overall communication activity associated with a user and the amount of time between communications, such as the amount of time between various messages sent by a user. Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. An edge between a user and another user may be associated with a connection strength specified by the user and providing information about a relationship between the user and the other user. For example, connections between a user and other users with which the user has a close relationship, such as family members, have relatively high connection strengths, while connections between the user and additional users with which the user has a more distant relationship have lower connection strengths. In some embodiments, a user selects from connection strengths associated with different types of relationships (e.g., family members, co-workers, friends, partners, etc.) when specifying a connection with another user, and the edge store 225 associates a selected connection strength with an edge describing the connection. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or in another user in the social networking system 140 based on the actions performed by the user. A user's affinity may be computed by the social networking system 140 over time to approximate a user's interest in an object, a topic, or another user in the social networking system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The group store 230 includes information identifying various groups of users. A group is associated with a group identifier stored by the group store 230 that uniquely identifies the group. One or more identifiers associated with users are associated with the group identifier to identify users of social networking system 140 included in the group. Other information may be associated with a group identifier, such as a name identifying a group corresponding to the group identifier, a description associated with the group, descriptive information associated with the group (e.g., a location), or other suitable information. Additionally, one or more content identifiers specifying content items are associated with a group identifier to identify content items associated with a group associated with the group identifier. If a content item, such as a message, is communicated to a group, the message is communicated to users associated with the group. Hence, maintaining a group allows content to be more easily communicated to users within the group by allowing content to be communicated to the group rather than communicated to various individual users. A group may be generated by a user of the social networking system 140 identifying users associated with the group 140 or the social networking system 140 may generate one or more groups based on characteristics associated with users of the social networking system 140. Users of the social networking system 140 associated with a group may change over time as users join or leave the group.

In some embodiments, the social networking system 140 includes a contact selection module 235, which identifies one or more additional users or groups of users to a user of the social networking system 140. A contact is an additional user or a group of users to which the user communicates content through the social networking system 140. To improve user interaction, the contact selection module 235 selects contacts for a user based on interactions between the user and additional users or between the user and a group of users. In various embodiments, the interactions between the user and the additional user or between the group of users are interactions by the user to communicate messages to the additional user or to the group via an interface of a messaging application associated with the social networking system 140 and executing on a client device 110. The messaging application may be a standalone application executing on the client device 110 or may be integrate with another application executing on the client device 110. The contact selection module 235 generates scores for additional users based on interactions between the user and various additional users via the messaging interface and generates scores for groups of users based on interactions between the user and groups of users via the interface of the messaging application. A score associated with an additional user or with a group of users provides a measure of a likelihood of the user interacting with the additional user or with the group of users via the interface of the messaging application. In various embodiments, a score associated with an additional user is based on messages communicated from the user to the additional user initiated via the interface of the messaging application and messages communicated from the user to the additional user after the user received a message from the additional user initiated via the interface of the messaging application. A frequency of interactions, a number of interactions, or any other suitable information based on interactions between the user and the additional user may be used to determine the score associated with the additional user. Similarly, messages communicated to a group by the user initiated via the interface of the messaging application or communicated by the user to the group after the user received a message from the group initiated via the interface of the messaging application are used to determine a score associated with the group. The contact selection module 235 may apply one or more models to interactions between the user and one or more additional users and to interactions between the user and one or more groups to determine the scores associated with additional users and associated with groups.

Based on the scores associated with one or more additional users and associated with one or more groups, the contact selection module 235 selects a set of contacts. For example, the contact selection module 235 ranks additional users and groups by their associated scores and selects a set of contacts as additional users or groups having at least a threshold position in the ranking. Alternatively, the contact selection module 235 selects a set of contacts as additional users or groups associated with at least a threshold scores. Information describing the set of contacts is communicated from the social networking system 140 to a client device 110 associated with the user for presentation via the interface of the messaging application. Selection of contacts is further described below in conjunction with FIG. 3.

The web server 240 links the social networking system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the social networking system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Selecting Contacts for Presentation to a Social Networking System User

Figure 3:
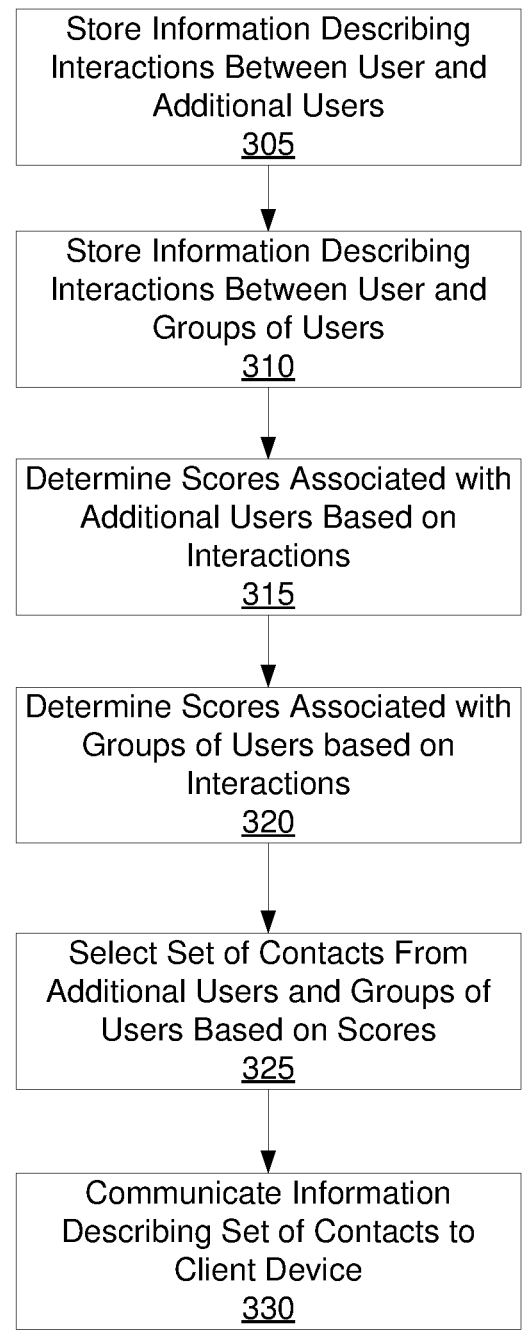
FIG. 3 is a flowchart of a method for identifying contacts for presentation to a user from additional users of a social networking system, in accordance with an embodiment.

FIG. 3 is a flowchart of one embodiment of a method for identifying contacts for presentation to a user from additional users of a social networking system 140. In other embodiments, the method may include different and/or additional steps than those shown in FIG. 3. Additionally, steps of the method may be performed in different orders than the order described in conjunction with FIG. 3.

The social networking system 140 stores 305 information describing interactions between a user and one or more additional users. As described above in conjunction with FIG. 2, information describing a variety of interactions may be stored, including information describing interactions between the user and additional users via an interface of a messaging application associated with the social networking system 140 and executing on a client device 110. Example interactions between a user and an additional user include: transmitting a message to the additional user via the interface of the messaging application, transmitting a response to a message received from the additional user via the interface of the messaging application, accessing user profile information associated with the additional user via the interface of the messaging application, or interacting with (e.g., commenting on, expressing a preference for, sharing, etc.) content provided to the social networking system 140 by the additional user via the interface of the messaging application. In some embodiments, the stored information identifies the user, the additional user, and a type of interaction between the user and the additional user. Additional information may also be stored, such as an indication of whether the additional user was accessing the social networking system 140 when the interaction occurred, an indication of whether the additional user is currently accessing the social networking system 140, or a type of client device 110 used by the additional user to access the social networking system 140.

Additionally, the social networking system 140 maintains information identifying various groups. A group includes multiple additional users of the social networking system 140. The user may interact with a group to provide content to the additional users included in the group, for example, via the interface of the messaging application. For example, the social networking system 140 maintains a group identifier and associates identifiers of additional users included in the group with the group identifier. If the user transmits a message to a group, the message is communicated to each additional user included in the group by the social networking system 140. The social networking system 140 also stores 310 information describing interactions between the user and one or more groups of users. Example interactions between the user and a group include: transmitting a message to the group via the interface of the messaging application, transmitting a response to a message received from an additional user included in the group and identifying the group via the interface of the messaging application, or accessing information describing the group. The stored information may identify the user, the group, and a type of interaction by the user with the group. Additionally, based on information associated with additional users in the group, the social networking system 140 may determine a number of additional users included in the group accessing the social networking system 140 when the user interacted with the group, a number of additional users included in the group currently accessing the social networking system 140, or types of client devices 110 used by various additional users in the group to access the online system 140.

Based on the stored information describing interactions between the user and the additional users, the social networking system 140 determines 315 scores associated with multiple additional users. A score associated with an additional user indicates a likelihood of the user interacting with the additional user based on stored interactions between the user and the additional user. In various embodiments, the social networking system 140 applies one or more models to stored interactions between the user and an additional user to determine 315 a score associated with the additional user. For example, a model associates different values with different types of interactions between the user and the additional user and determines a score associated with the additional user by combining the values associated with different types of interactions.

Different models may be used depending on information associated with the additional user. For example a model is used to determine 315 a score associated with an additional user if information associated with the additional user by the social networking system 140 indicates the additional user is currently accessing the social networking system 140, while an alternative model is used to determine 315 the score associated with the additional user if information associated with the additional user by the social networking system 140 indicates the additional user is not currently accessing the social networking system 140. Similarly, different models may be used to determine 315 a score associated with an additional user depending on whether information associated with the additional user indicates the additional user is accessing the online system 140 using different types of client devices 110. For example, different models are used to determine 315 a score associated with an additional user depending on whether the additional user accesses the online system 140 via a mobile device or via a desktop computer or a laptop computer.

Additionally, based on the stored information describing interactions between the user and one or more groups of users, the social networking system 140 determines 320 scores associated with various groups of users. A score associated with a group of users indicates a likelihood of the user interacting with the group of users via the interface of the messaging application based on based on stored interactions between the user and the group of users via the interface of the messaging application. In various embodiments, the social networking system 140 applies one or more models to stored interactions between the user and an additional user to determine 315 a score associated with the additional user. For example, a model associates different values with different types of interactions between the user and the additional user and determines a score associated with the additional user by combining the values associated with different types of interactions. In addition to messages transmitted to the group and responses to messages received via the group via the interface of the messaging application, other types of interactions may be used to determine 320 a score associated with a group. For example, interactions with content presented via the group, such as comments on content items presented via the group, indication of preferences for content items presented via the group, or sharing of a content presented via the group. In some embodiments, the score associated with a group is based on scores associated with additional users associated with the group. For example, the score associated with a group is a weighted average or other combination of scores associated with additional users who are associated with the group. Further, a model may also account for a number of additional users included in the group of users currently accessing the social networking system 140 when determining 320 a score for the group based on values associated with different types of interactions between the user and the group. As described above, a number or percentage of additional users in a group accessing the social networking system 140 via different types of client devices 110 (e.g., mobile devices), may also be a factor used to determine 320 a score associated with the group.

Using the scores associated with one or more additional users and the scores associated with one or more groups, the social networking system 140 selects 325 a set of contacts from the one or more additional users and the one or more groups. A contact includes information identifying an additional user or a group and information for communicating a message to the additional user or to the group. In one embodiment, the social networking system 140 ranks one or more additional users and one or more groups based on their associated scores and selects 325 contacts as additional users or groups having at least a threshold position in the ranking. Alternatively, the social networking system 140 selects 325 one or more additional users or one or more groups associated with at least a threshold score as contacts. In some embodiments, the social networking system 140 selects 325 at least one group as a contact. For example, the social networking system 140 ranks additional users and groups based on their associated scores and selects 325 a group having a highest position in the ranking relative to other groups as a contact in addition to selecting 325 additional users or groups having at least a threshold position in the ranking as contacts. Alternatively, a group associated with a maximum score relative to scores associated with the one or more groups is selected 325 as a contact along with one or more additional users or groups associated with at least a threshold score. This allows the contacts to include at least one group. In some embodiments, an order associated with contacts in the set of contacts is also determined based on the scores associated with additional users or groups included in the set of contacts. For example, contacts in the set of contacts are ranked based at least on their associated scores, with the order of the contacts based the ranking; hence, contacts associated with higher positions in the ranking have higher positions in the order.

Information identifying the set of contacts is communicated 330 from the social networking system 140 to a client device 110, which presents the information to the user via the interface of the messaging application. When the user interacts with information identifying a contact presented via the interface of the messaging application, the messaging application communicates with the social networking system 140 and initiates a communication channel between the user and the contact for communicating messages via the social networking system 140. Information identifying each contact in the set of contacts may be communicated 330 to the client device 110. In some embodiments, information identifying a contact includes an image associated with the contact (e.g., a profile image associated with an additional user, an image associated with a group) along with information for communicating information to the contact. The client device 110 may present the information identifying the contacts in a portion of a display of the messaging interface to allow the user to more easily access information identifying one or more contacts. For example, images associated with contacts in the set of contacts are presented proximate to a border of a display of content presented by the client device 110 through the messaging interface associated with the social networking system 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
storing, for a viewing user of an online system, first interactions and second interactions, each first interaction being between the viewing user and a plurality of individual user contacts of the viewing user, each second interaction being between the viewing user and a group contact of a plurality of group contacts, each individual user contact being a user of the online system and each group contact including a plurality of users of the online system;
determining a plurality of first scores based on the first interactions and a plurality of second scores based on the second interactions, each of the plurality of first scores corresponding to a score for an individual user contact and each of the plurality of second scores corresponding to a score for a contact group;
ranking the plurality of individual user contacts and the plurality of group contacts in a single ranking based at least in part on the determined first scores and the determined second scores, the single ranking including at least one individual user contact and at least one group contact ranked relative to each other based on the first interactions and the second interactions;
selecting a threshold number of the plurality of ranked individual user contacts and the plurality of ranked group contacts from the single ranking as suggested contacts for presentation to the viewing user, wherein the suggested contacts include at least one individual user contact and at least one group contact; and providing information describing an order of the suggested contacts in the single ranking to a client device of the viewing user, the client device displaying the suggested contacts to the viewing user in an interface of a messaging application.

2. The method of claim 1, wherein the first interactions are selected from a group consisting of: initiating transmission of a message to the individual user contact via the interface associated with the messaging application, initiating transmission of a response to a message received from the individual user contact via the interface associated with the messaging application, and any combination thereof.

3. The method of claim 1, wherein the second interactions are selected from a group consisting of: initiating transmission of a message to the group contact via the interface associated with the messaging application, initiating transmission of a response to a message received from the group contact via the interface associated with the messaging application, and any combination thereof.

4. The method of claim 1, providing the threshold number of selected individual user contacts and one or more groups to the client device of the viewing user includes providing an image for each suggested contact.

5. The method of claim 1, wherein the first score associated with the individual user contact is further based at least in part on one or more selected from a group consisting of: an indication of whether the individual user contact is accessing the online system, a type of client device used by the individual user contact to access the online system, and any combination thereof.

6. A computer program product comprising a non-transitory computer readable storage medium having instructions encoded thereon that, when executed by a processor, cause the processor to:
store, for a viewing user of an online system, first interactions and second interactions, each first interaction being between the viewing user and a plurality of individual user contacts of the viewing user, each second interaction being between the viewing user and a group contact of a plurality of group contacts, each individual user contact being a user of the online system and each group contact including a plurality of users of the online system;
determine a plurality of first scores based on the first interactions and a plurality of second scores based on the second interactions, each of the plurality of first scores corresponding to a score for an individual user contact and each of the plurality of second scores corresponding to a score for a contact group;
rank the plurality of individual user contacts and the plurality of group contacts in a single ranking based at least in part on the determined first scores and the determined second scores, the single ranking including at least one individual user contact and at least one group contact ranked relative to each other based on the first interactions and the second interactions;
select a threshold number of the plurality of ranked individual user contacts and the plurality of ranked group contacts from the single ranking as suggested contacts for presentation to the viewing user, wherein the suggested contacts include at least one individual user contact and at least one group contact; and
provide information describing an order of the suggested contacts in the single ranking to a client device of the viewing user, the client device displaying the suggested contacts to the viewing user in an interface of a messaging application.

7. The computer program product of claim 6, wherein the one or more first interactions are selected from a group consisting of: initiating transmission of a message to the individual user contact via the interface associated with the messaging application, initiating transmission of a response to a message received from the individual user contact via the interface associated with the messaging application, and any combination thereof.

8. The computer program product of claim 6, wherein the one or more second interactions are selected from a group consisting of: initiating transmission of a message to the group contact via the interface associated with the messaging application, initiating transmission of a response to a message received from the group contact via the interface associated with the messaging application, and any combination thereof.

9. The computer program product of claim 6, providing the threshold number of selected individual user contacts and one or more groups to the client device of the viewing user includes providing an image for each suggested contact.

10. The computer program product of claim 6, wherein the first score associated with the individual user contact is further based at least in part on one or more selected from a group consisting of: an indication of whether the individual user contact is accessing the online system, a type of client device used by the individual user contact to access the online system, and any combination thereof.

11. A computer program product comprising a non-transitory computer readable storage medium having instructions encoded thereon that, when executed by a processor, cause the processor to:
store, for a viewing user of an online system, first interactions between the viewing user and a plurality of individual user contacts of the online system through a messaging application of the online system;
store, for the viewing user, second interactions between the viewing user and a plurality of group contacts of the online system, each group contact including a plurality of individual user contacts through the messaging application of the online system;
determine a user interaction score for each of the plurality individual user contacts, the user interaction score indicating a likelihood of the user interacting with an individual user contact of the plurality of individual user contacts based at least in part on first interactions of the first interactions between the viewing user and the individual user contact;
determine a group contact interaction score for each of the plurality of group contacts, the group interaction score indicating a likelihood of the user interacting with a group contact of the plurality of group contacts based at least in part on second interactions between the viewing user and the group contact;
select one or more of the plurality of individual user contacts and one or more of the plurality of group contacts to present to the viewing user as suggested contacts for the messaging application based at least in part in part on the user interaction score for each of the plurality of individual user contacts and the group interaction score for each of the plurality of group contacts, wherein selecting the one or more suggested contacts comprises:

ranking the plurality of individual user contacts and the plurality of groups into a single ranking of contracts based at least in part on the user interaction score for each of the plurality individual user contacts and the group interaction score for each of the plurality of group contacts; and selecting the one or more suggested contacts from a top threshold number of contacts from the single ranking; and communicate information describing an order of the suggested contacts in the single ranking to a client device for presentation to the viewing user in an interface of the messaging application that presents information associated with contacts, information with a contact initiating communication with the content via the online system when accessed.

12. The computer program product of claim 11, wherein selecting the one or more suggested contacts based at least in part in part on the user interaction score for each of the plurality individual user contacts and the group interaction score for each of the plurality of group contacts comprises:

select a contact as an individual user contact or a group contact having at least a threshold position in the single ranking.

13. The computer program product of claim 11, wherein an interaction between the user and an individual user contact is selected from a group consisting of: initiating transmission of a message to the individual user contact via the interface associated with the messaging application, initiating transmission of a response to a message received from the individual user contact via the interface associated with the messaging application, and any combination thereof.

14. The computer program product of claim 11, wherein an interaction between the viewing user and a group contact is selected from a group consisting of: initiating transmission of a message to the group contact via the interface associated with the messaging application, initiating transmission of a response to a message received from the group contact via the interface associated with the messaging application, and any combination thereof.

15. The computer program product of claim 11, wherein selecting the one or more suggested contacts based at least in part in part on the user interaction score for each of the plurality individual user contacts and the group interaction score for each of the plurality of group contacts comprises:

determining an order of the one or more suggested contacts based on the user interaction score for each of the plurality individual user contacts and the group interaction score for each of the plurality of group contacts.

16. The computer program product of claim 11, wherein the score associated with the individual user contact is further based at least in part on one or more selected from a group consisting of: an indication of whether the individual user contact is accessing the online system, a type of client device used by the individual user contact to access the online system, and any combination thereof.

* * * * *